Sept. 28, 1943.                     W. W. WARNER                      2,330,648
                       REVERSING SPLIT PHASE MOTOR CONTROL
                              Filed Sept. 4, 1942

Inventor:
Wilbur W. Warner,
by Harry E. Dunham
His Attorney.

Patented Sept. 28, 1943

2,330,648

UNITED STATES PATENT OFFICE 2,330,648

REVERSING SPLIT PHASE MOTOR CONTROL

Wilbur W. Warner, Fort Wayne, Ind., assignor to General Electric Company, a corporation of New York Application September 4, 1942, Serial No. 457,289

5 Claims. (Cl. 172—279)

My invention relates to reversible split phase motor control and its object is to provide a control and reversing mechanism by means of which the motor may be reversed with reversing torque power by an instantaneous throwing of the reversing switch and without waiting by the operator for the motor to slow down. The same switch may have an "off" center position and be used as the line switch for the motor.

Figure 5:
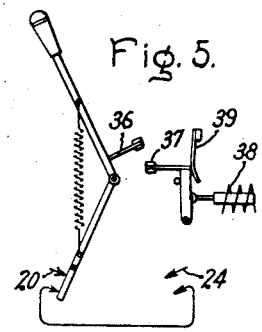

The features of my invention which are believed to be novel and patentable will be pointed out in the claims appended hereto. For a better understanding of my invention, reference is made in the following description to the accompanying drawing in which Fig. 3 represents a four lead single phase capacitor motor and control embodying my invention. Fig. 4 represents a three lead capacitor motor and control embodying my invention. In both Figs. 3 and 4 the same control switch mechanism and relay are used. This same reversing switch relay mechanism is shown also in Figs. 1 and 2, the four figures showing the mechanism in different operating positions. Fig. 5 represents a simplified reversing switch with no center or off position.

Figure 1:
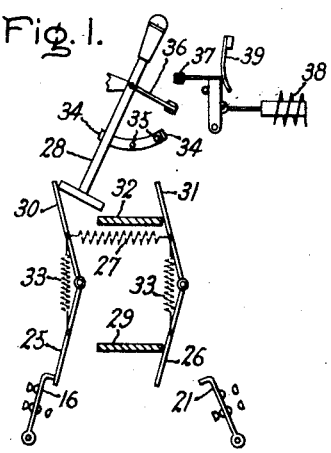

In Figs. 3 and 4, 10 represents a single phase A. C. supply line, 11 the squirrel cage rotor of a split phase motor and 12 and 13 the two stator windings which are displaced at an angle to each other of the order of 90 degrees. 14 represents a phase splitting device such for example as a condenser and 15 represents an automatic switch responsive to the speed of the motor, shown in full lines in its low speed position and in dotted lines in its high speed position. In both Figs. 3 and 4 the motor is energized from the source 10 through the reversing switch mechanism shown which comprises a movable switch arm 16 biased against a contact 17, but movable against contacts 19 and 20, also a movable switch arm 21 biased against a contact 22 but movable against contacts 23 and 24. The movable switch arms 16 and 21 are controlled by a pair of toggles which are resiliently tied together by a spring 27 and movable to the different positions shown by an operating handle 28. The movement of the lower arm 25 and 26 of the toggles is limited by stops. In Fig. 3, arm 26 is stopped in its movement to the right by switch arm 21 resting against contacts 23 and 24, and arm 25 is limited in its movement to the right by a stop member 29. When these arms 25 and 26 are thrown to the left, as shown in Fig. 1, they are stopped by switch member 16 resting against contacts 19 and 20 and by stop member 29, respectively. The upper arms 30 and 31 of these toggles are limited in their inward movement by the center stop 32 and in their outward movements by the spring tie 27. For instance in Fig. 1 arm 31 is stopped against 32 and arm 30 is held from further movement to the left by spring 27 which predominates over the springs 33 of the individual toggles. Fig. 1 shows the limit of movement of operating handle 28 in a clockwise direction and Fig. 3 shows its limit of movement in a counterclockwise direction. Stops 34 are provided at these limiting positions and resilient catches 35 are provided at the extreme and center positions of handle 28 to prevent movement from such positions except by forceful movement thereof. The handle 28 has some lost motion with respect to the pair of toggle arms 30 and 31 and all switch opening and closing operations are performed with a snap action. Thus toggle arms 31 and 26 in moving from the position of Fig. 3 to that of Fig. 1 are accompanied by a snap action of arm 26 at about the time arm 31 moves against stop 32. Hence, switch arm 21 tends to spring away from contacts 23 and 24 and move quickly against contact 22.

Figure 2:
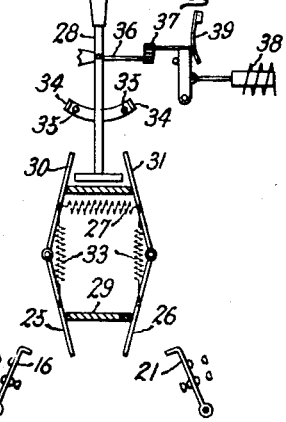
Figure 3:
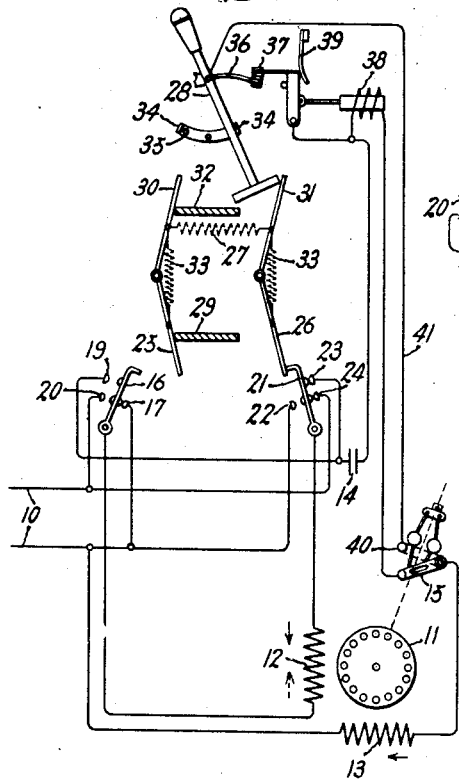
Figure 4:
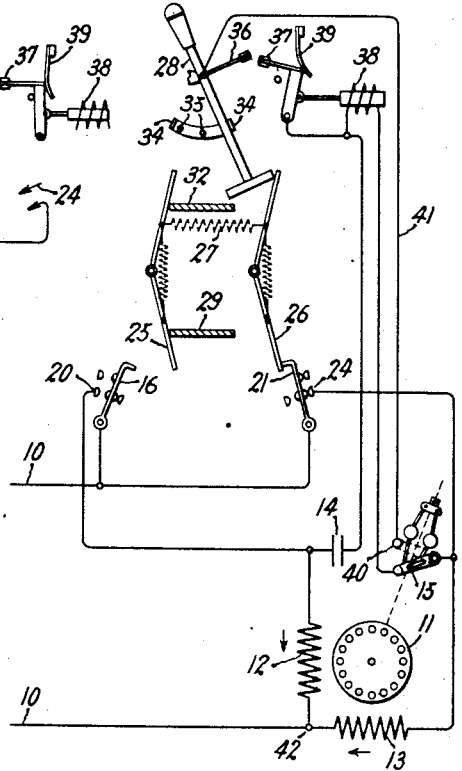

Handle 28 may be thrown from either extreme position to the other, from either extreme position to the center position shown in Fig. 2, and from the center position to either extreme position with a snap action of the mechanism to produce the different switch operations indicated in Figs. 1, 2, 3 and 4.

Secured to but insulated from arm 28 is a resilient contact finger 36 connected by a lead 41 to the running contact 40 of the speed responsive switch 15. Cooperating with contact 36 is a contact 37 which may be withdrawn from contacting position as represented in Fig. 4 by a low resistance relay 38. When the relay is deenergized, contact 37 is moved to contacting position by a spring 39 as shown in Figs. 1, 2 and 3 where it will be engaged by contact 36 when attempt is made to move contact 36 past contact 37 in either direction. If relay 38 is deenergized when this attempt is made, contacts 36 and 37 will engage as shown in Fig. 3. However, if the relay 38 is now energized, contact 37 will be withdrawn and contact 36 will move by as shown in Fig. 4 and the contacts will not reengage when relay 38 is now deenergized.

The operation of these contacts is the same for either direction of movement of switch operating arm 28. If, for the condition represented in Fig. 3 relay 38 be deenergized, contacts 36 and 37 move to the positions shown in Fig. 4. If, now, relay 38 be deenergized, contact 37 will move back to contacting position but will not engage contact 36 until arm 28 is swung clockwise. Fig. 1 shows the relative positions of these contacts where contact 37 has been released in moving downward past contact 37 due to energization of relay 38 and the relay then deenergized again. Thus these contacts may be closed or opened for either extreme position of switch operating arm 28, depending upon the circumstances mentioned. In the center position of the switch arm 28, as shown in Fig. 2, it is immaterial whether contacts 36 and 37 close or not, since this is an "off" position.

When a motor with four leads is used, it is connected as shown in Fig. 3. The connections are those for starting the motor in one direction. Winding 12 is energized from the upper line conductor through contact 24, switch arm 21, winding 12, switch arm 16 and contact 17 to the lower line conductor and we will assume that when so energized the direction of current flow through winding 12 at a given instant is that shown by the full line arrow adjacent thereto.

Winding 13 is energized from the upper line conductor through contact 24, switch arm 21, contact 23, condenser 14, relay 38, switch 15 in starting position through winding 13, back to the lower line conductor in the direction indicated by the arrow adjacent winding 13 at the given instant. The motor thus starts using winding 13 as the starting winding. Until indicated otherwise the following description refers to the four lead motor of Fig. 3 although I will refer to Fig. 4 for the switch position there shown, since the same switch may be used for either four lead or three lead motors. The current through relay 38 causes this relay to withdraw contact 37 from contact 36 as indicated in Fig. 4. As the motor approaches running speed, speed responsive switch 15 moves to the running (dotted line) position to contact 40 and thus opens the circuit of winding 13, since the connection that would otherwise be established through contacts 36 and 37 is open. Relay 38 is now deenergized and its contact 37 moves back to contacting position but does not engage contact 36 because the latter has moved to the position shown in Fig. 4. The motor thus runs single phase until a change is required. To stop the motor, the switch operating lever 28 is moved to the position shown in Fig. 2 and to reverse the motor it is thrown to the position shown in Fig. 1.

In the center or stopping position of the switch (Fig. 2), connection to the upper line conductor is open at contacts 20 and 24. Hence the motor can receive no current, regardless of other connections.

When the switch is thrown from the position shown in Fig. 4 to that shown in Fig. 1 to reverse the motor, winding 12 will be energized from the upper line conductor through contact 20, switch 16, winding 12, switch 21, contact 22 to the lower line conductor and hence the relative direction of current through winding 12 has been reversed as indicated by the dotted line arrow adjacent thereto. Winding 13 is energized from the upper line conductor through contact 20, switch 16, contact 19, condenser 14, contact 37, contact 36, line 41, contact 40, switch 15 and winding 13 back to the lower line. The relative direction of current flow through winding 13 is thus the same for both directions of rotation.

The connection just described is made when the motor is up to speed in one direction for reversing its direction of rotation. Hence the speed responsive switch 15 is in running position and a powerful reversing torque is produced, which continues until the motor speed drops and the speed responsive switch moves to starting position. The same motor winding connections are then again established except that the current through winding 13 now flows through relay 38 and the starting contact of the speed responsive switch. Hence reversing torque is continued and the motor stops and starts in the opposite direction. When relay 38 was energized, as just described, it withdrew contact 37 and allowed contact 36 to pass by to the position shown in Fig. 1. Hence when the motor has reversed and reached running speed in the opposite direction such that relay 38 is again deenergized, the starting winding 13 is opened and remains open when the switch 15 moves to running position on contact 40. The motor will thus run single phase until handle 28 is moved to stop or reverse the motor.

If, now, arm 28 be thrown from position 1 to position 3 to reverse the motor, the connections will be as shown in Fig. 3 except initially switch 15 will be on the running contact 40 to establish the reversing torque condition. It is thus seen that with the arrangement and connection of Fig. 3 the motor may be reversed by simply a substantially instantaneous throwing of switch arm 28 from one extreme position to the other and that it is unnecessary to wait upon the slowing down of the motor and operation of the speed responsive switch for completing the movement of the reversing handle 28. Also, the same switch mechanism may be used to start and stop the motor or as a line switch because on its central position (Fig. 2) the motor windings are completely deenergized.

I will now describe the connections and operation of the three lead motor of Fig. 4 but I may refer to the switch position of Fig. 3 therein.

In Fig. 4 there is a common connection 42 from the lower line conductor to both motor windings and hence the motor needs to have only three leads brought out and is thus referred to as a three lead motor to distinguish it from the four lead motor of Fig. 4.

When the motor of Fig. 4 is at rest, the switch will be in the position of Fig. 2 in which condition the motor is disconnected from the upper line conductor. The switch is then thrown to start the motor as represented in Fig. 4. Winding 12 is energized from the upper line conductor through switch 21, contact 24, switch 15, in starting position, relay 38, condenser 14, winding 12 to the lower line conductor. Since relay 38 is thus energized it will withdraw contact 37 and release contact 36 as indicated in Fig. 4. Winding 13 is energized from the upper line conductor through switch 21, contact 24, winding 13 to the lower line conductor.

Hence the motor starts using winding 12 as the start winding and which is cut out when the motor comes up to speed when switch 15 moves to the running contact 40. To reverse, handle 28 is thrown to the position shown in Fig. 1 but with contacts 36 and 37 closed. Winding 12 is now energized from the upper line conductor through switch 16, contact 20, winding 12 to the lower conductor. Winding 13 is energized from the upper line conductor through switch 16, contact 20, condenser 14, contacts 37 and 36, wire 41, contact 40, switch 15 in running position, winding 13 to the lower line conductor. It will be noted that in reversing, the relative direction of current through the two windings does not reverse but that the condenser is switched from one winding circuit to the other so that the windings are alternately used as running and starting windings for the two directions of rotation. Hence an external phase splitting device must be used for the three lead motor. The reversing connection produces a strong reversing torque which quickly decreases the speed and switch 15 moves to the starting position energizing relay 38, with-drawing contact 37 and allowing contact 36 to pass by to the open position shown in Fig. 1. The direction of current flow through the motor winding circuits remains the same so that the motor reverses and comes up to speed in the opposite direction, switch 15 moves to running position and opens the circuit of winding 13. Relay 38 is deenergized and its contact 37 moves back in position to be engaged by contact 36 when the next reversing operation occurs.

The contacts 17, 19, 22 and 23 are not used for the three lead motor of Fig. 4. If it is desirable to use a separate line switch for the motor, the center "off" position of the snap action reversing switch can be omitted and the switch simplified. Such simplified snap switch with contacts used for three lead motor is shown in Fig. 5.

Owing to the fact that in reversing it is only necessary to move the reversing switch from one extreme position to the other, and the mechanism operates with a snap action, the mechanism may be used as a limit switch for automatic reversing service. It is to be noted that the reversing switch is effective to reverse the motor when the motor is running slow and before the speed responsive switch has moved to running position because then the reversing torque connection is completed through the starting contact of the speed responsive switch and is the same as the starting connection for the opposite direction of rotation.

What I claim as new and desire to secure by Letters Patent of the United States is:

1. A reversible split phase motor control comprising a split phase motor having a pair of angularly displaced energizing windings, a speed responsive switch therefor having starting and running contacts, a source of single phase supply, a snap action reversing switch mechanism having motor reversing positions, contacts associated therewith, connections including such contacts through which the motor windings may be energized for one direction of rotation when the reversing switch is in one of its reversing positions and for the opposite direction of rotation when the reversing switch is in its other reversing position, the energizing connection for one of said motor windings including the speed responsive switch and its starting contact whereby such winding is deenergized when the motor comes up to speed, and means for establishing a reversing motor torque connection comprising the speed responsive switch and running contact thereof, and a switch which is closed by the reversing movement of the reversing switch mechanism and which is opened in response to the flow of current through the starting contact of the speed responsive switch.

2. A reversible split phase motor control comprising a split phase motor having angularly displaced energizing windings, a single phase source of supply, a snap action reversing switch having contacts and connections to the motor and source of supply for energizing said windings for opposite directions of motor rotation, a speed responsive switch having a starting contact which is opened by said switch to open the starting winding circuit of the motor when the motor comes up to speed, means for establishing a reversing torque connection for said motor comprising a running contact for the speed responsive switch, a switch in series with such running contact which switch is closed by said reversing switch when the latter is thrown to reverse the motor, and relay means connected to be energized through said starting contact for opening the last mentioned switch when the speed responsive switch returns to starting position during a reversing operation.

3. A reversible split phase motor control comprising a motor having angularly displaced windings, a single phase source of supply, a snap action reversing switch means connected between said source of supply and motor having contacts for energizing the motor for reverse directions of rotation, a speed responsive switch means having a starting contact through which one of said motor windings is energized during starting for deenergizing such winding when the motor comes up to speed, provisions for establishing a reversing torque circuit connection for said motor during a reversing operation in response to the throwing of said reversing switch means and during the time the speed responsive switch means is in its running position, said circuit being in parallel with the energizing circuit through the speed responsive switch means when in starting position and including a running contact of the speed responsive switch means and a switch which is closed by the reversing operation of the reversing switch means, and a relay having an energizing winding in series with the starting contact of the speed responsive switch means, which relay when energized opens said switch.

4. A reversible split phase motor control comprising a motor having angularly displaced exciting windings, a single phase source of supply and a reversing and energizing switch mechanism therefor, said mechanism having two extreme positions for energizing the motor for opposite directions of rotation and an intermediate position for deenergizing the motor, said mechanism being designed to obtain quick, substantially instantaneous snap action motion between said different positions, a relay in the starting winding circuit of the motor, a speed responsive switch in the starting winding circuit of the motor having a starting contact for opening such circuit when the motor comes up to speed and a running contact for completing a reversing torque connection when the motor is running up to speed and the reversing switch mechanism is operated to reverse the motor and a switch for establishing such reversing torque connection comprising a contact which is moved to closing position when the reversing switch mechanism is operated to reverse the motor and a contact moved to open position by said relay whenever the starting winding circuit is energized.

5. A reversing control for split phase motors comprising in combination with such a motor having angularly displaced energizing windings, a speed responsive switch having starting and running positions for opening one of the energizing winding circuits when the motor comes up to speed, a single phase source of supply, a snap action reversing switch connected between said motor and source having reversing positions and by means of which the motor may be alternately energized for opposite directions of rotation by movement of said reversing switch back and forth between such positions when the speed responsive switch is in starting position, and other means operated directly by the movement of the reversing switch to reverse the motor for establishing a reversing torque motor connection effective only when the speed responsive switch is in running position.

WILBUR W. WARNER.